Feb. 1, 1966     S. H. YOST     3,233,134
ELECTRIC MOTOR

Filed Sept. 24, 1962     2 Sheets-Sheet 1

INVENTOR:
SAMUEL H. YOST,
BY David Young
ATT'Y.

INVENTOR;
SAMUEL H. YOST,
BY David Young
ATT'Y.

United States Patent Office 3,233,134
Patented Feb. 1, 1966

3,233,134
ELECTRIC MOTOR
Samuel H. Yost, Worthington, Ohio, assignor to Jeffrey Galion Manufacturing Company, a corporation of Ohio
Filed Sept. 24, 1962, Ser. No. 225,769
8 Claims. (Cl. 310—201)

The instant invention relates to electric motors, and more particularly to improvements in an explosion-proof electric motor, wherein elements of the motor are enclosed within a closed chamber.

Explosion-proof electric motors are utilized in equipment that is operated in environments containing explosive gases, or other substances, which would likely be ignited as the result of a spark from electrical equipment. The results of such an ignition and the consequent explosion could obviously be disastrous. Therefore, great precautions are taken against the same. One application for explosion-proof electric motors is in coal mining equipment. Although ventilating equipment is provided in coal mines, such equipment is not always completely effective for removing combustible and explosive gases from the mine, especially at the working face where methane gas is often liberated at very high rates, and therefore, great precautions are taken to avoid ignition thereof. All electrical equipment for coal mine use must be certified as permissible, meaning that such equipment must be enclosed within explosion-proof housings, which form closed chambers for the electrical elements enclosed therein. In the case of an electric motor, this means that the motor housing must form a closed chamber for elements of the motor that is explosion-proof, and the motor elements therein include the stator, rotor and other electrical elements of the motor.

Since the motor housing is effectively closed against the rapid exchange of gases, this gives rise to a problem of cooling the motor, inasmuch as it is not possible to circulate cooling air directly around the elements of the motor that are most subject to heating, these being particularly the stator and the rotor. Thus, these elements of the motor are likely to become overheated, and this overheating may become so severe as to result in such damage to the elements of the motor as to affect the performance thereof, or to put the same completely out of operation. An example of a motor application, in which the motor is subject to severe overheating, is in coal loading machines, in which the coal loader is suddenly thrust into a pile of coal, as the result of which the motor which drives the loading elements of the machine suddenly has a maximum load imposed upon it, and then as the coal is loaded, the load is gradually decreased. This cycle may be repeated many times, without interruption, giving rise to the development of extremely high temperatures of the motor elements enclosed within the explosion-proof motor housing. In some cases, these operating conditions are so severe that the rotor has melted, thereby immediately rendering the motor inoperative. In such case, the motor must be removed and a new motor substituted.

It is, accordingly, an object of the instant invention to provide an electric motor of improved construction, which will withstand the severe operating conditions, particularly with respect to overheating of the motor as above described.

It is another object of the instant invention to provide an improved explosion-proof motor, in which elements of the motor are enclosed within a housing forming a closed chamber for such elements, and in which the motor will withstand overheating of the motor elements.

It is still another object of the instant invention to provide an improved explosion-proof electric motor, in which the rotor is enclosed within a closed chamber and will withstand extremely elevated operating temperatures.

Other objects of the instant invention will appear hereinafter, the novel features and combinations being set forth in the appended claims.

Figure 1:
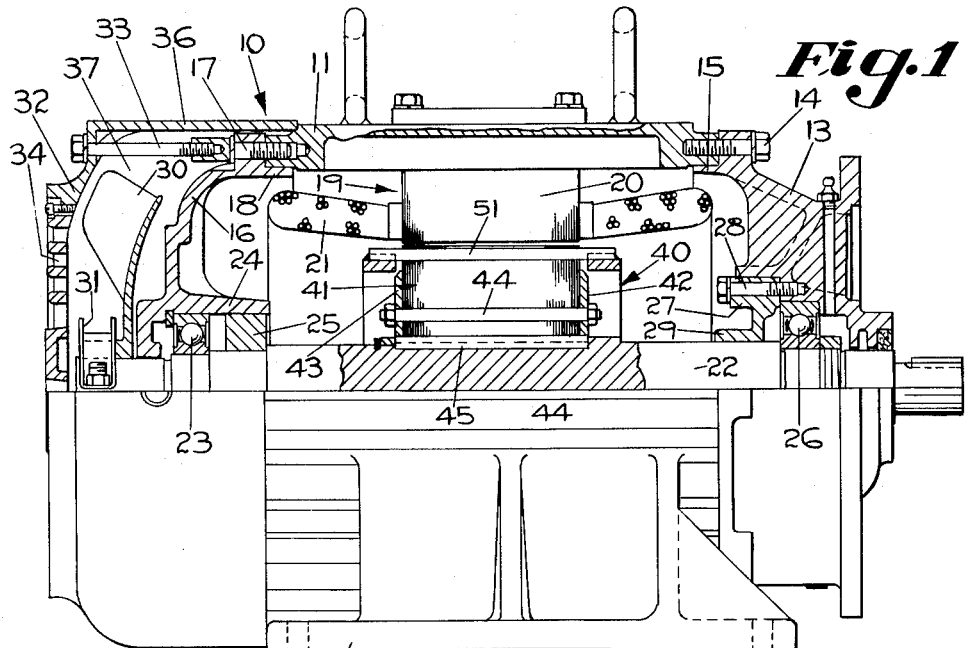
FIG. 1 is an elevational view, partially in section, of an explosion-proof electric motor embodying the instant invention.
Figure 4:
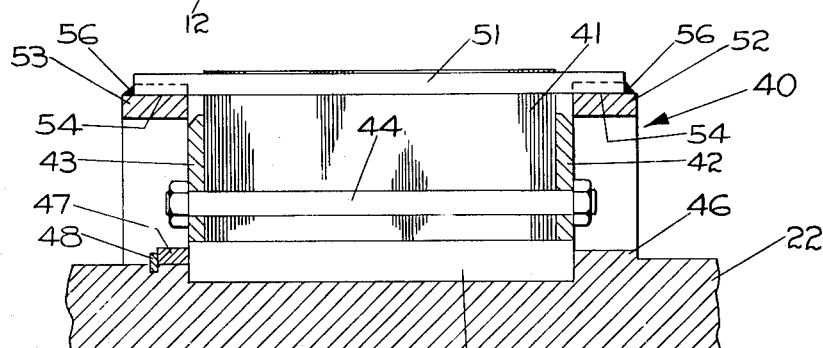
FIG. 4 is a vertical sectional view of the rotor of FIG. 3.

Referring to the drawings, there is illustrated in FIG. 1 an explosion-proof electric motor 10, comprising a main frame 11 formed with suitable feet 12, by which the motor 10 may be secured in place on a foundation or in a piece of equipment which is driven by the motor 10. One end of the main frame 11 is closed by an outside end cover 13, which is secured to the main frame 11 by a plurality of circumferentially disposed bolts 14. The annular junction of the main frame 11 and the end cover 13 includes an internal flange 15 of substantial length, which serves to provide a sealed junction between the main frame 11 and the end cover 13. The other end of the main frame 11 is closed by an inside end cover 16, which is secured to the main frame 11 by a plurality of circumferentially disposed bolts 17. The inside end cover 16 also includes an annular flange 18 of substantial length, to form a seal at the junction of the main frame 11 and the end cover 16.

A stator 19 is disposed within the main frame 11 and includes a stator core 20 secured to the inner wall of the main frame 11, and a stator winding 21 wound on the stator core 20 and extending around the inside of the main frame 11.

A shaft 22 extends through the housing of the electric motor 10, said housing being formed by the assembly including the main frame 11 and the opposite end covers 13, 16. The shaft 22 is rotatably supported in the end cover 16 by an anti-friction bearing 23, the inner race of which is fitted on the shaft 22, and the outer race of which is fitted within a sleeve 24 integrally formed with the end cover 16. A seal ring 25 is fitted on the shaft 22 beyond the bearing 23 and has a close fit within the sleeve 24. The seal ring 25 is of susbtantial axial length, whereby it cooperates with the sleeve 24 to form a restricted path that effectively closes the junction between the shaft 22 and the end cover 16.

The other end of the shaft 22 is rotatably supported in the opposite end cover 13 by an anti-friction bearing 26. The inner race of the bearing 26 is fitted to the shaft 22, and the outer race thereof is fitted in the bore of the end cover 13. A collar 27 is secured to the end cover 13, on the inside of the latter, by a plurality of bolts 28. The collar 27 includes a flange 29 of substantial axial length, which surrounds and closely fits the shaft 22 to provide a restricted path that effectively closes the junction between the shaft 22 and the end cover 13. The shaft 22 extends beyond the end cover 13 for driving connection to devices which are driven by the electric motor 10.

Figure 2:
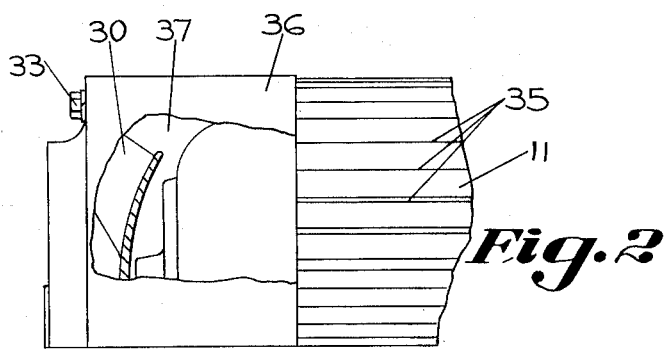
FIG. 2 is an elevational view of a portion of the motor, partially broken away, showing the cooling means for the motor.

The shaft 22 also extends beyond the inside end cover 16, and a fan 30 is secured to the projecting end of the shaft 22 by a suitable clamp 31. The fan 30 is enclosed by a hood 32, which is secured over the inside end cover 16 by a plurality of bolts 33. The hood 32 has a plurality of louvres 34, formed in the end thereof for the admission, of air which is drawn in by the fan 30. As best seen in FIG. 2, the outside of the main frame 11 is formed with a plurality of ribs or fins 35, and the annular rim portion 36 of the hood 32 is in contact with the tops of the ribs or fins 35, whereby the spaces between the latter are exposed to the fan chamber 37 within the hood 32. Thus, the fan 30 effectively draws cooling air in through the louvres 34 and blows the same out over the ribs or fins 35, to provide some cooling for the electric motor 10. However, there is no circulation of cooling air directly over the stator 19 and rotor 40, which are the elements most likely to become overheated due to extreme conditions of usage. The stator 19 being closest to the wall of the main frame 11 will be more effectively cooled than will the rotor 40, which has no physical contact with the main frame 11 and is removed therefrom. Accordingly, the problem of overheating is most severe with respect to the rotor 40.

The rotor 40 is formed on the shaft 22, and includes a plurality of rotor discs 41 which are stacked with clamping end plates 42, 43 being disposed at each end of the stack of rotor discs 41. The rotor discs 41 and the clamping end plates 42, 43 are secured in assembly by a plurality of bolts 44, which clamp the rotor discs together between the clamping end plates 42, 43. The bolts 44 are disposed at equally spaced positions around the rotor discs 41. This assembly of the rotor discs between the clamping end plates 42, 43 forms the rotor core, which is non-rotatably secured to the shaft 22 by a key 45. The clamping end plate 42 abuts against an integral collar 46, formed on the shaft 22, and which serves to fix the axial position of the rotor 40 on the shaft 22. A spacing ring 47 is placed on the shaft 22 abutting the clamping end plate 43, and a retaining ring 48 is engaged with the shaft 22 to hold the spacing ring 47 against the clamping end plate 43, and to thereby secure the rotor 40 in fixed axial position on the shaft 22.

Figure 3:
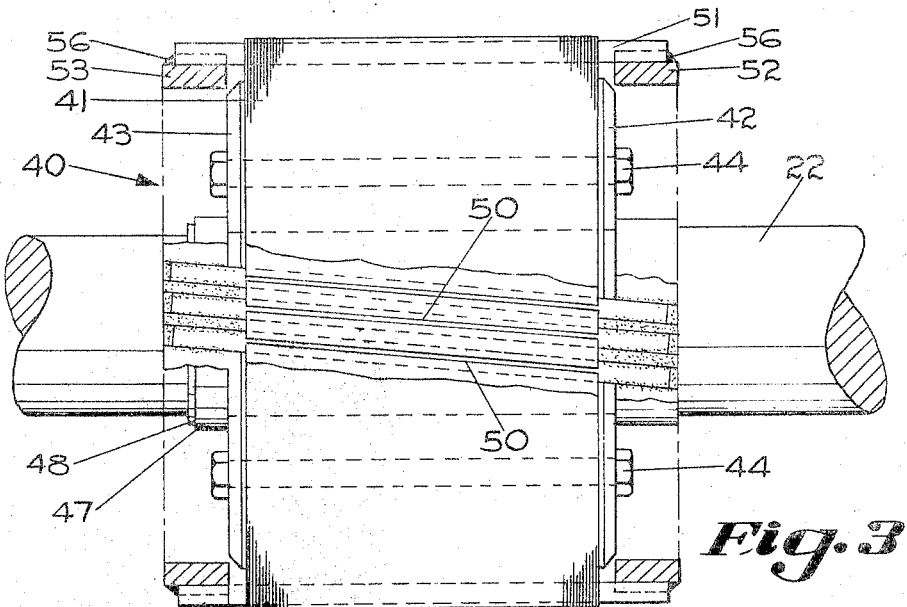
FIG. 3 is a view of the motor rotor.
Figure 5:
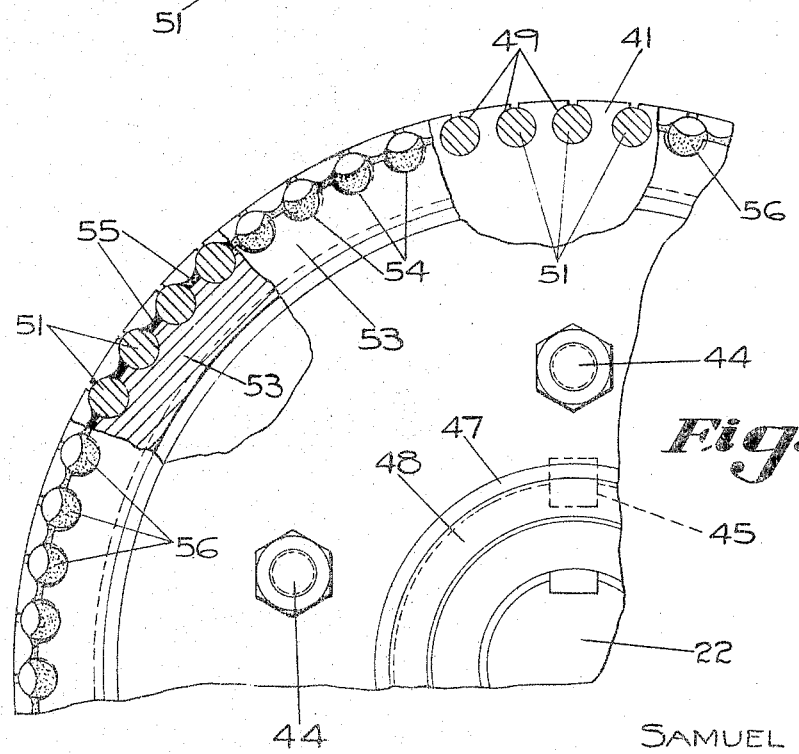
FIG. 5 is an end elevational view, partially in section, of the rotor of FIG. 3.

Each rotor disc 41 is formed with a plurality of circumferentially disposed apertures 49. The apertures 49 in adjacent rotor discs 41 are stepped relatively to each other in a circumferential direction, so that the successive apertures 49 in successive rotor discs 41 are aligned along a line that is skewed with respect to the axis of the shaft 22, as best seen in FIG. 3. Slots 50 are cut through the periphery of the rotor discs 41 into the apertures 49, to provide proper conductive paths in the rotor 40. Rotor bars 51 extend one through each aligned row of apertures 49, with the ends of the rotor bars 51 projecting substantially beyond the opposite ends of the stacked rotor discs 41. End rings 52, 53 are placed at the opposite ends of the rotor 40, in engagement with the projecting ends of the rotor bars 51. In the disclosed embodiment of the invention, the rotor bars 51 are formed of rods having a circular section. The end rings 52, 53 are, accordingly, formed with a plurality of peripheral slots 54, each having a semi-circular cross section, adapted to receive the projecting ends of the rotor bars 51, and to form a connection between the rotor bars 51 and the end rings 52, 53. The rotor bars 51 are secured to the end rings 52, 53 by welding 55 in the areas of the end rings 52, 53 between the rotor bars 51 and the end ring slots 54. Also, the end ring slots 54 extend beyond the ends of the rotor bars 51, and there is welding 56 in the portions of the slots 54 which are disposed beyond the ends of the rotor bars 51.

In the rotor 40, constructed in accordance with the instant invention, the rotor discs 41 may be formed of silicon steel. The rotor bars 51 and the end rings 52, 53 are formed of nickel material having the combined proper electrical conductive properties and proper physical resistance to excessive heating. One nickel material that has been found to be satisfactory for the rotor bars and end rings of the rotor 40, as described herein, is type "A" nickel, which is approximately 99.5% pure nickel. This material may be obtained from the Huntington Alloy Products Division, the International Nickel Company, Inc., Huntington, West Virginia. The designation of the material as type "A" nickel has been changed to type 200 nickel, and this material is specified and described in Technical Bulletin T-15 of the Huntington Alloy Products Division. This material has the added advantage that it is easily welded or fused, lending itself to the type of rotor construction described herein. It is also possible to braze the rotor bars and end rings, which is another way in which these elements may be secured to each other. Thus, in the electric motor 10 embodying the instant invention, the elements thereof, particularly the stator and rotor, may be subjected to excessive heating without damage to these elements, whereby the motor will remain operative.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the instant invention, what it is desired to secure by Letters Patent of the United States is:

1. In an electric motor, a rotor comprising a plurality of rotor bars extending longitudinally thereof and disposed in circumferentially spaced positions around the rotor, said rotor bars being formed of material that is substantially pure nickel, an end ring at each end of the rotor connected to the ends of the rotor bars and secured to the rotor bars, and said end rings being formed of material that is substantially pure nickel.

2. In an electric motor, a rotor comprising a plurality of rotor bars extending longitudinally thereof and disposed in circumferentially spaced positions around the rotor, said rotor bars being formed of material that is substantially pure nickel, an end ring at each end of the rotor connected to the ends of the rotor bars, each of said end rings being formed with slots in which the ends of the rotor bars are placed, said slots in the end rings extending beyond the ends of said rotor bars, said end rings being formed of material that is substantially pure nickel, and said rotor bars being secured to the end rings by welding in the areas of the end rings between adjacent rotor bars and in the end ring slots beyond the ends of the rotor bars.

3. In an electric motor, a rotor comprising a rotor body, a plurality of rotor bars extending longitudinally of the rotor body and disposed in circumferentially spaced positions around the rotor body, said rotor bars being formed of material that is substantially pure nickel, an end ring at each end of the rotor body connected to the ends of the rotor bars, said end rings being formed of material that is substantially pure nickel, and said rotor bars and end rings being secured to each other by welding.

4. In an electric motor, as recited in claim 3, in which the rotor bars and end rings are formed of type 200 nickel.

5. A rotor for an electric motor comprising a plurality of rotor bars extending longitudinally thereof and disposed in circumferentially spaced positions around the rotor, an end ring at each end of the rotor joining the rotor bars, and said rotor bars and end rings being formed of material that is substantially pure nickel.

6. A rotor for an electric motor comprising a plurality of rotor bars extending longitudinally thereof and disposed in circumferentially spaced positions around the rotor, an end ring connecting said rotor bars, and said rotor bars and end ring being of material that is substantially pure nickel.

7. A rotor as recited in claim 5, in which said material is type 200 nickel.

8. A rotor as recited in claim 6, in which said material is type 200 nickel.

(References on following page)

References Cited by the Examiner

UNITED STATES PATENTS

| | | | |
|---|---|---|---|
| 1,433,622 | 10/1922 | Johnson | 310—211 |
| 1,586,877 | 6/1926 | Buckley. | |
| 1,761,764 | 6/1930 | Witherow. | |
| 2,188,398 | 1/1940 | Bernard | 310—211 |
| 2,533,735 | 12/1950 | Lohr | 148—32 |
| 2,638,425 | 5/1953 | Allen | 148—32 |
| 2,644,099 | 6/1953 | Ludwig et al. | 310—88 |
| 2,784,333 | 3/1957 | Gunselman | 310—211 |

ORIS L. RADER, *Primary Examiner.*

MILTON O. HIRSHFIELD, *Examiner.*